United States Patent
Swan

(10) Patent No.: US 11,891,887 B2
(45) Date of Patent: Feb. 6, 2024

(54) VAPOR RECOVERY APPARATUS AND METHOD FOR OIL AND GAS WELLS

(71) Applicant: Randy Swan, Granbury, TX (US)

(72) Inventor: Randy Swan, Granbury, TX (US)

( * ) Notice: Subject to any disclaimer, the term of this patent is extended or adjusted under 35 U.S.C. 154(b) by 277 days.

(21) Appl. No.: 17/166,247

(22) Filed: Feb. 3, 2021

(65) Prior Publication Data

US 2021/0156242 A1 May 27, 2021

Related U.S. Application Data

(62) Division of application No. 16/144,496, filed on Sep. 27, 2018, now Pat. No. 10,941,643.

(60) Provisional application No. 62/563,790, filed on Sep. 27, 2017.

(51) Int. Cl.
*E21B 43/34* (2006.01)
*B01D 19/00* (2006.01)
*B01D 19/02* (2006.01)

(52) U.S. Cl.
CPC .......... *E21B 43/34* (2013.01); *B01D 19/0047* (2013.01); *B01D 19/0068* (2013.01); *B01D 19/0073* (2013.01); *B01D 19/02* (2013.01); *B01D 2257/702* (2013.01)

(58) Field of Classification Search
None
See application file for complete search history.

(56) References Cited

U.S. PATENT DOCUMENTS

| | | | |
|---|---|---|---|
| 1,753,401 A | 11/1926 | Bucking |
| 2,309,075 A | 3/1939 | Hill |
| 2,970,107 A | 5/1955 | Gilmore |
| 3,073,129 A | 1/1963 | Grenier |
| 4,602,923 A | 7/1986 | Bernstein |
| 4,824,447 A | 4/1989 | Goldsberry |
| 6,209,642 B1 | 4/2001 | Streetman |
| 7,033,420 B2 | 4/2006 | Liebig |
| 7,255,540 B1 | 8/2007 | Cooper |
| 7,780,766 B2 | 8/2010 | Thompson |
| 9,205,348 B2 | 12/2015 | Swan |
| 9,522,347 B2 | 12/2016 | Swan |
| 2011/0168017 A1 | 7/2011 | Lamers |
| 2013/0270194 A1 | 1/2013 | Allen |
| 2015/0090122 A1 | 4/2015 | Hemstock |
| 2018/0059692 A1 | 3/2018 | Swan |

FOREIGN PATENT DOCUMENTS

CA 1244778 11/1988

*Primary Examiner* — Christopher P Jones
*Assistant Examiner* — Phillip Y Shao
(74) *Attorney, Agent, or Firm* — Brian K. Yost; Decker Jones, PC

(57) ABSTRACT

A vapor recovery apparatus degasses oil and water produced by an oil well. The apparatus has a first vessel forming a column. Oil containing gas enters the bottom of the first vessel and flows up to a liquid outlet. Heat is applied to the rising oil, wherein the oil foams. Gas escapes into the upper end. The foam flows into a second column and along a roughened surface. The bubbles in the foam break apart, releasing the gas. The oil flows down the second column to an outlet. Water is introduced into a third vessel. The water releases gas therein, which gas mingles with the gas from the oil. The third vessel is located around the first and second vessels. A compressor may be used to withdraw the gas and provide hot compressed gas to heat the rising oil in the first column.

6 Claims, 3 Drawing Sheets

VAPOR RECOVERY APPARATUS AND METHOD FOR OIL AND GAS WELLS

This application is a divisional of U.S. patent application Ser. No. 16/144,496 filed Sep. 27, 2018, which claims the benefit of U.S. Provisional Patent Application No. 62/563,790 filed Sep. 27, 2017, each of which is hereby incorporated by reference.

FIELD OF THE INVENTION

The present invention relates to vapor recovery systems for wells, oil and gas processing facilities and the accompanying surface storage tanks and related equipment.

BACKGROUND OF THE INVENTION

Liquids, such as crude oil, condensate and water, produced from wells typically contain gasses such as natural gas and liquid petroleum gas (LPG). Large amounts of oil, condensate and water that are produced are stored in storage tanks, awaiting transport, further processing or refining. When liquid is stored in a storage tank, gas contained in the liquid can separate or vaporize due to a variety of factors. For example, if the liquid experiences a pressure drop, then vapors will flash off. If the liquid level in the storage tank changes, or the liquid is agitated, the gas separates. If the tank is subjected to temperature swings or barometric pressure changes, gas can also separate from the liquid.

Due to environmental and economic reasons, it is desirable to capture these gasses. Capturing the gasses allows the gas to be sold. Alternatively, the gas can be burned. Venting the gas into the atmosphere is generally frowned upon and in most cases is restricted or requires permits.

Furthermore, providing liquid with gasses that can vaporize into a storage tank results in pressure changes inside the tank. As the pressure changes, atmospheric air may be drawn into the storage tank. Oil equipment operators, and in particular pipeline operators, do not want atmospheric air, with oxygen, introduced into their equipment due to problems with corrosion.

Thus, it is desirable to put so called "dead" oil, without gasses, into storage tanks. Dead oil does not produce gas inside of a storage tank, even when subjected to agitation, pressure drops, or temperature changes.

In the prior art, various types of equipment exists to separate and capture gas from liquid before the liquid is provided to a storage tank. One particular type of equipment, a vapor recovery tower (VRT), discussed in my U.S. Pat. No. 9,522,347, has proven particularly effective in removing gas from liquids such as oil. The vapor recovery tower separates the gas from liquid in such a manner so as not to introduce air into the storage tank.

Although oil has been known to contain dissolved gasses, in the industry, operators traditionally treated the water as containing little or no gas and therefor did not process the water for degassing. That is no longer the case as regulations require the water to be degassed.

It is desired to treat both oil and water produced from an oil or gas well to remove gas therefrom.

DESCRIPTION OF THE PREFERRED EMBODIMENT

The vapor recovery apparatus and method process fluids from an oil and gas well. The fluids contain liquid components such as crude oil, condensate and water. The fluids also contain gasses such as natural gas and liquid petroleum gas. Many of the gasses easily vaporize or are otherwise volatile. Vapors and volatile compounds are removed from the liquid components in an efficient manner. The vapors and volatile compounds can be sold or flared off.

The vapor recovery apparatus processes both oil and water by removing gas from the liquids. Before entering the vapor recovery apparatus, the liquids are separated into an oil (and related liquids such as condensate) stream and a water stream. The liquid streams, or circuits, remain separated during vapor recovery in the apparatus. After being degassed, the liquids are "dead" and are stored in the respective storage vessels. Dead liquids in storage vessels minimize temperature related pressure changes within the respective vessel. Consequently, the venting of gas into the surrounding atmospheric air from the respective storage vessel is minimized if not eliminated.

A number of advantages are provided. The degassing operations are combined in a single apparatus of nested vessels. The single apparatus maintains the separation of the oil circuit from the water circuit. A single apparatus is less costly to purchase than multiple units, is easier to install in the field at a well site and is easier to operate and maintain.

The degassing operations provide a water shell for the water circuit, which water shell surrounds the oil circuit. The oil circuit utilizes heat to assist in separating the gas from the oil. The water shell serves as an insulator to retain the heat in the oil circuit, further enhancing gas recovery.

Normally, the oil and water circuits are kept separate. However, if one of the circuits should surge and overflow, or become inadvertently closed, flow in that circuit can divert to the other circuit. This prevents flooding of downstream compression and metering equipment and prevents over pressurization of the apparatus.

Water produced from wells tends to be corrosive in nature and shorten the useful life of dedicated water equipment. The apparatus provides oil mist that serves to protect at least the upper part of the apparatus from such corrosion.

The liquids flow through the vapor recovery apparatus in a passive manner. No pumps or agitators are needed.

Figure 1:
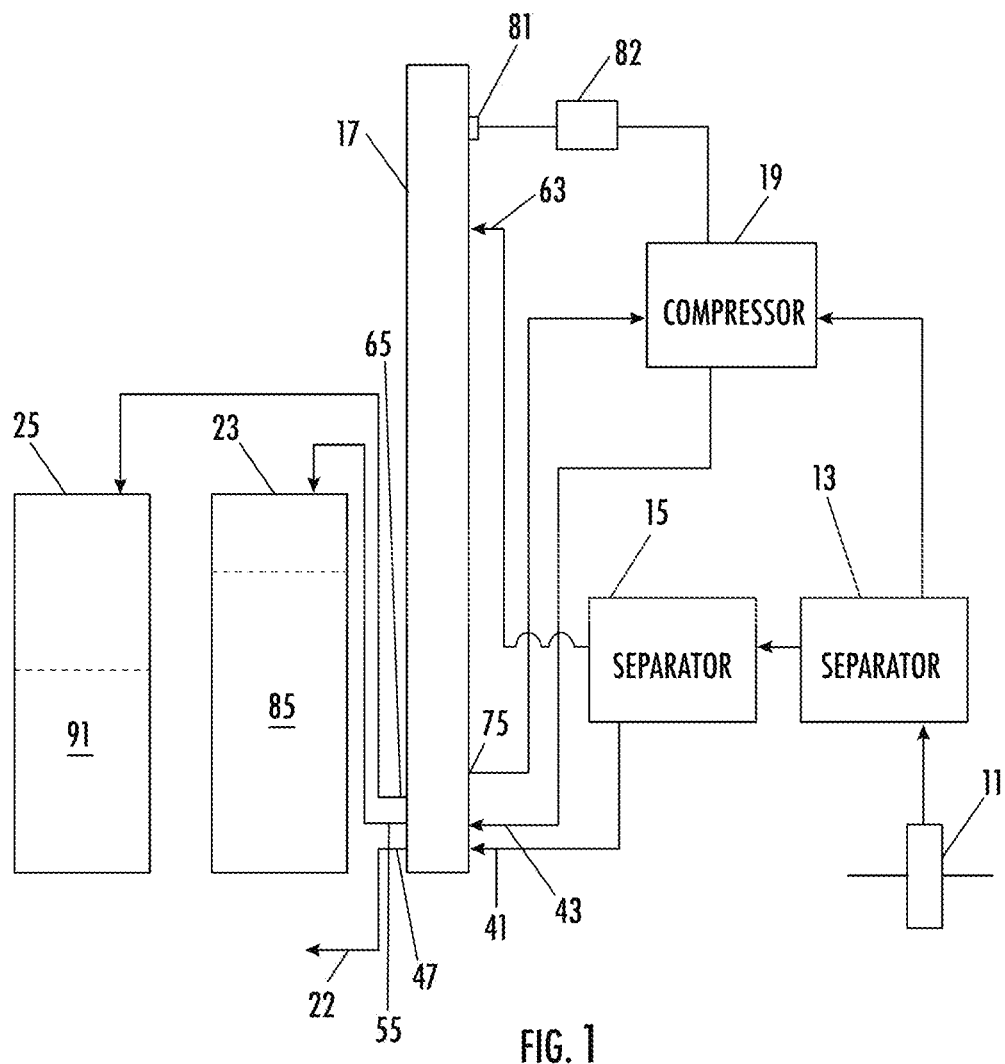
FIG. 1 is a diagram showing various surface components of a producing oil well, including a vapor recovery tower.

In FIG. 1, there is shown a producing oil well 11 with various surface equipment. Fluids flow out of the well into various separation equipment, the specifics of which depend on the fluids produced by the well. FIG. 1 shows an example of separation equipment. The fluids flow into a two phase separator 13, which separates gas from liquids. The gas then flows to other equipment, such as a compressor 19. The liquids flow to an oil-water separator 15, such as a heater treater. The heater treater separates the oil from the water. As used herein, "oil" refers to the liquid containing crude oil, and also containing other liquids such as condensate. The two phase separator 13 and the heater treater 15 are conventional and commercially available.

Despite the passage of the liquids through the two phase separator 13, the liquids still typically contain dissolved gas.

The liquids are processed to remove vapors or volatile compounds by way of a vapor recovery tower 17.

The oil enters the vapor recovery tower 17 in an oil circuit and after being degassed, exits the tower. The oil then flows into an oil storage tank 23. Alternatively, the oil may be provided to a pipeline for transport. The water enters the vapor recovery tower 17 in a water circuit that is separate from the oil circuit, and after being degassed, exits the tower and flows to a water storage tank 25.

The oil and water exiting the tower 17 are dead, or mostly without gasses that can separate from the oil or water under normal atmospheric conditions.

Vapors leave the vapor recovery tower 17 and flow to the compressor 19. The compressed gas leaves the compressor 19 and enters the vapor recovery tower before flowing to a sales line 22.

The vapor recovery tower improves upon my earlier vapor recovery tower, described in U.S. Pat. No. 9,522,347. The entire disclosure of U.S. Pat. No. 9,522,347 is incorporated herein by reference.

Figure 2:
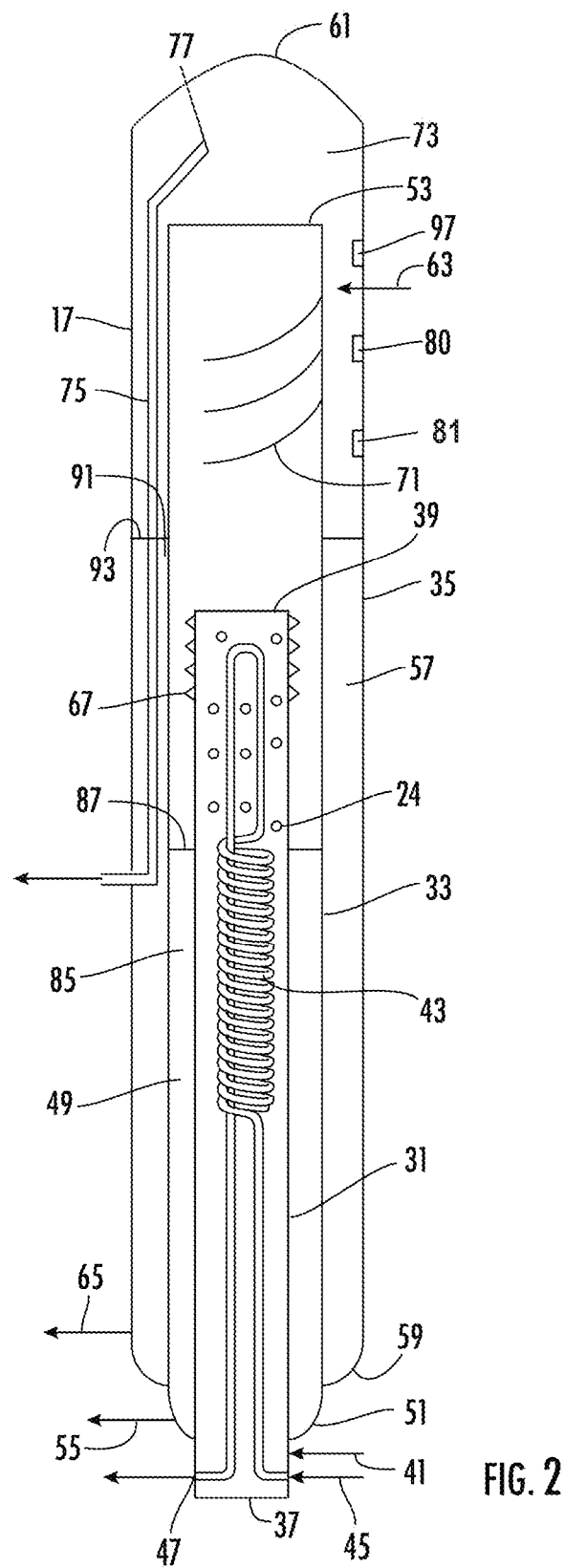
FIG. 2 is side cross-sectional view of the vapor recovery tower of the present invention, in accordance with a preferred embodiment.

FIG. 2 shows the vapor recovery tower 17 of the present invention, in accordance with a preferred embodiment. The tower is vertically oriented. The tower has an inner vessel 31, an intermediate vessel 33 and an outer vessel 35. The vessels are nested with the inner vessel 31 being located inside of the intermediate vessel 33, which in turn is located inside of the outer vessel 35. Oil flows up inside the inner vessel 31 and down inside the intermediate vessel 33 before exiting the tower. Water flows down inside the outer vessel 35, but outside of the intermediate vessel 33 and the oil contained therein.

Each vessel will be described in turn.

The inner vessel 31 is a tube with a closed bottom end 37, or base plate, and an open top end 39. The bottom end 37 can bear on the ground or on a support structure. An oil inlet 41 is provided near the bottom end 37 of the inner vessel 31. A heat exchanger 43 is located in the inner vessel between the oil inlet 41 and the top end 39. In the preferred embodiment, the heat exchanger 43 is a coil, through which flows compressed gas from the compressor 19. Other types of heating mediums can be used inside this exchanger such as glycol, or another hot liquid or gas. There is a compressor gas inlet 45 and a gas outlet 47. The inlet 45 is located near the bottom end 37. The compressor gas inlet 45 is connected to the output of the compressor 19. The gas outlet 47 is connected to the gas sales line 22.

The intermediate vessel 33 surrounds and extends above the inner vessel 31. (In FIG. 2, most of the intermediate vessel 33 is shown in cross-section to allow viewing of the inner vessel 31, except the upper portion of the intermediate vessel is not shown in cross-section to allow viewing of the plates or ribs 71.) The intermediate vessel 33 is a tube of larger inside diameter than the outside diameter of the inner vessel 31, such that there is an annulus 49 between the inner and intermediate vessels. The intermediate vessel 33 is centered concentrically about the inner vessel 33 and within the outer vessel 35. Radially extending supports can be used to position the vessels 31, 33, 35 concentrically. The intermediate vessel has a closed, or capped bottom end 51. In the preferred embodiment, the bottom end 51 of the intermediate vessel is located above the bottom end 37 of the inner vessel. This simplifies the inner vessel inlets 41, 45 and outlet 47. However, the inner vessel could be completely contained within the intermediate vessel. The intermediate vessel 33 has an open top end 53 located a distance above the top end 39 of the inner vessel. Near the bottom end 51 of the intermediate vessel, there is an oil outlet 55 which connects to one or more oil storage tanks 23. The oil outlet 55 communicates with the annulus 49.

The outside surface 67 of the upper end portion of the inner vessel 31 is modified to increase the surface area over a smooth surface in order to assist in separating gas from the oil. Material can be subtracted from or added to the inner vessel to roughen the outside surface 67. Material can be subtracted from the inner vessel, as for example, by scoring or sand blasting. Alternatively, material such as expanded metal or radial bars commonly referred to as riffle boards or plates can be secured (such as by welding) to the outside surface.

An oil path or circuit extends inside the inner vessel 31 from the oil inlet 41, past the heat exchanger 43, to the top end 39, then through the annulus 49 down to the oil outlet 55.

The outer vessel 35 surrounds and extends above the intermediate vessel 33. The outer vessel 35 is a tube of larger inside diameter than the outside diameter of the intermediate vessel 33, such that there is an annulus 57 between the intermediate and outer vessels. The outer vessel has a closed, or capped bottom end 59. In the preferred embodiment, the bottom end 59 of the outer vessel is located above the bottom end 51 of the intermediate vessel. This simplifies the intermediate vessel outlet 55. Alternatively, the intermediate vessel could be completely contained within the outer vessel. The outer vessel has a closed top end 61 located a distance above the top end 53 of the intermediate vessel.

A water inlet 63 is provided near the top end 61 of the outer vessel, which inlet communicates with the annulus 57. A water outlet 65 is provided at the bottom end 59. The water inlet 63 is located and designed to direct the incoming water against a surface, such as the outside diameter of the intermediate vessel 33 or the inside diameter of the outer vessel 35. The surface contacting the incoming water is roughened in order to assist in breaking up the flow of water.

Figure 3:
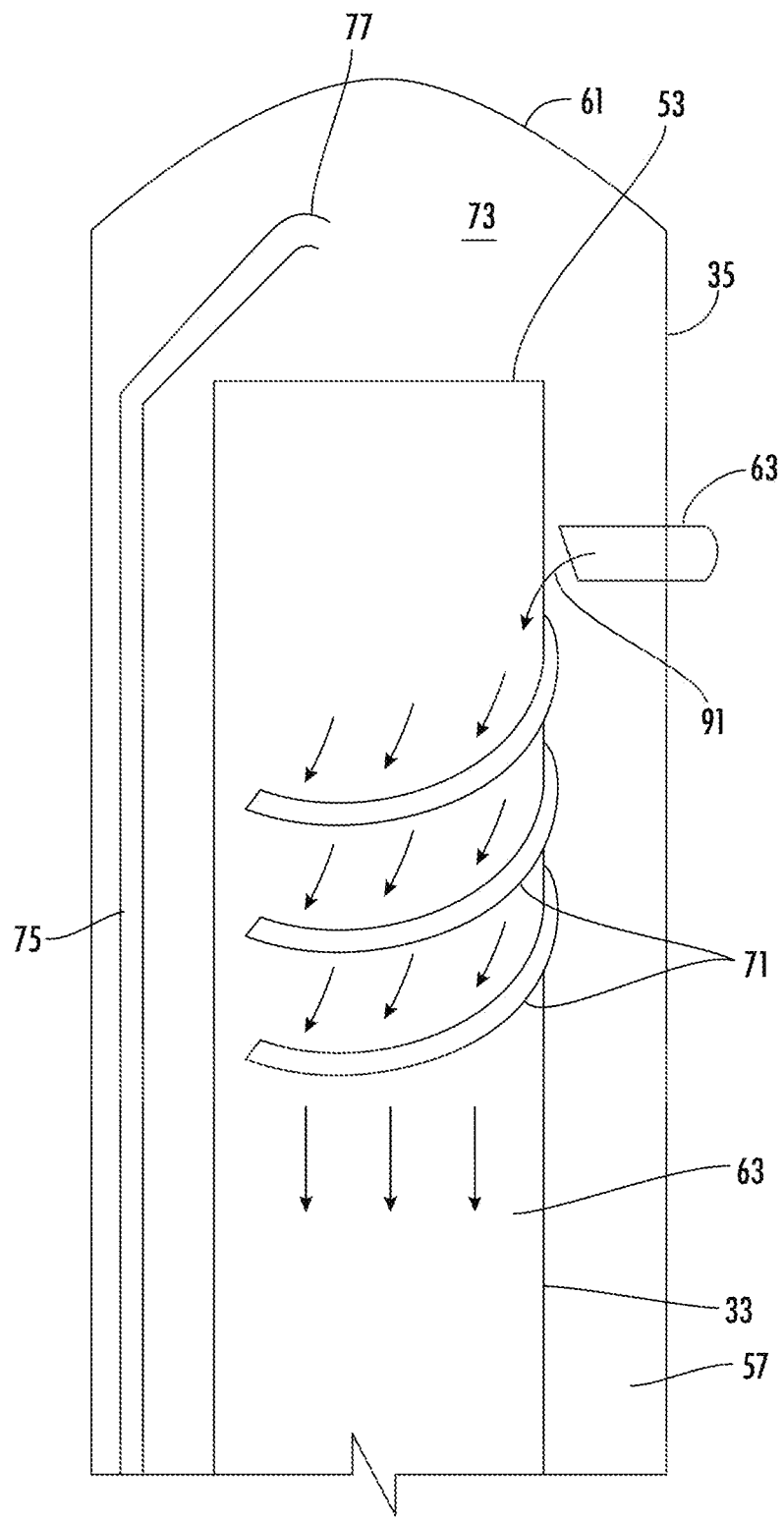
FIG. 3 is a close up side view of water spilling into the outer vessel and traveling down.

An example of such roughening is shown in FIG. 3. Water 91 enters the outer vessel through the water inlet 63 located near at the upper end 53 of the intermediate vessel 33. The outside of the intermediate vessel, adjacent to the water inlet, is provided with riffle plates 71 or ribs that extend radially out from the intermediate vessel for a distance and extend circumferentially around at least a portion of the vessel. The riffle plates 71 also slope or spiral downward from the area of water impact. (FIG. 2 also shows the riffle plates 71 for orientation purposes, although FIG. 2 is a sectional view where the riffle plates ordinarily would not be in view.)

A water path or circuit extends inside of the outer vessel 35 from the water inlet 63 down inside the annulus 57 to the water outlet 65.

The intermediate vessel 33 and the outer vessel 35 communicate with one another at their upper ends, as shown by interior space 73. Gas from the oil circuit comingles with gas from the water circuit. A gas outlet pipe 75 has an inlet 77 located in the space 73. The pipe 75 extends down inside of the outer vessel, entering the annulus 57 and then exiting the tower. The pipe 75 is connected to the input of the compressor 19.

The outer vessel 35 has tie-off lugs (not shown) located along its length and spaced around the circumference. The tie-off lugs can be used to secure bracing or cabling to maintain the tower in a vertical orientation. The top end 61 has lifting lugs, which may be of the pivoting type. The lifting lugs are used during installation of the tower (with a crane).

The outer and intermediate vessels also have sensors coupled thereto by ports. The ports provide access to the interior by the sensors. There may be a temperature sensor 80 and a pressure sensor 81. The sensors can be manually read, or can send data by cables or wirelessly to other devices.

The compressor 19 has an input that is connected to the pressure sensor 81 by way of a controller 82 (see FIG. 1). The controller is programmable. When the internal pressure of the tower increases to a first predetermined pressure, the controller 82 causes the compressor 19 to operate. When the internal pressure falls below another, second, predetermined pressure, the controller causes the compressor to stop operating. The first predetermined pressure to start operation of the compressor is selected so as not to interfere with the release of gas from oil and water in the tower. The second predetermined pressure, to cause the compressor to stop operating, may be less than atmospheric pressure, so as to apply a partial vacuum to the tower interior. Operating the compressor involves starting and stopping the compressor. As an alternative to stopping the compressor, the compressor can be idled or unloaded via an inlet control valve. As another alternative, a bypass can be used, where the gas input to the compressor is selected from the tower 17 and another source, such as the separator 13. When the tower pressure increases, the gas input is taken from the tower. When the tower pressure is low, the gas input into the compressor comes from the other source.

Oil 85 pools in the annulus 49. The top surface, or level 87, of oil in the annulus is a distance below the top end 39 of the inner vessel. When the oil outlet 55 is connected to a bottom region of the oil storage tank 23, the level 87 of oil in the annulus 49 reflects the level of oil in the storage tank 23. The height of the top end 39 of the inner vessel is located above the top end of the storage tank 23. Thus, the level 87 of oil in the tower can follow the level of oil in the storage tank 23.

Alternatively, the oil outlet 55 can be connected to a pipe at the top of the storage tank. The pipe is generally horizontal and has a top pipe into the storage tank. Oil in the annulus 49 in the tower 17 pushes oil out through the outlet 55 and up to the pipe, where it drops into the tank 23. Thus, the oil level 87 in the tower 17 is above the pipe. The pipe can feed oil to a single storage tank. Alternatively, the pipe can connect to a manifold that feeds oil to plural storage tanks.

Likewise, water 91 pools in the annulus 57, with the top level 93 reflecting the level of the water in the water storage tank 25.

In operation, oil 85 from the separation equipment 13, 15 is introduced into the bottom of the inner vessel 31 by way of the oil inlet 41. This oil 85 typically contains gas. The oil in the bottom is displaced upwardly by incoming oil. A column of oil forms in the inner vessel. As the oil rises inside of the column formed by the inner vessel 31, it follows a first liquid oil path. The oil is raised in temperature by the heat exchanger 43. The heat exchanger 43 receives hot compressed gas from the compressor 19 and can increase the temperature of the oil by 20-30 degrees F. Other heating mediums can be used in lieu of hot compressed gas, such as glycol, or other sources of hot liquid or gas. Furthermore, as the oil rises inside of the inner vessel 31, it is subjected to less and less hydrostatic pressure. The decrease in pressure and the increase in temperature present more favorable conditions to separate the gas from the oil as lowering the pressure and increasing the temperature lowers the boiling point of the liquids which flash to gas. The gas 24 bubbles out of the oil. As the gas is separated from the oil, the density of the fluid in the upper end portion of the inner vessel 31 decreases, thereby further reducing hydrostatic pressure on the oil and releasing even more gasses. The warm oil rises to the top of the inner vessel, also contributing to the release of gasses through the reduction of hydrostatic pressure.

By the time the oil reaches the open top end 39 of the inner vessel 31, the oil is likely foaming because the gasses are separating and leaving the oil. The gasses travel up inside of the intermediate vessel 33 to the upper space 73.

The foamed oil spills over the edge of the top end 39 of the inner vessel 31. The foam moves along another liquid path, namely by falling down the roughened outside surface 67 of the inner vessel. As the foam 66 travels down the roughened outside surface 67, the bubbles in the foam tend to break apart, releasing the gas therein and further separating gas from the oil. The outside surface 67 could be smooth. However, in the preferred embodiment, the outside surface 67 is modified to increase the surface area. Material can be subtracted from or added to the inner vessel to roughen the outside surface. Material can be subtracted from the inner vessel, as for example, by sand blasting. Alternatively, material such as expanded metal or radial bars commonly referred to as riffle boards or plates can be secured (such as by welding) to the outside surface. The falling oil enters the pool 85 of oil. The distance between the top end 39 of the inner vessel and the top surface 87 of the pool in the annulus is sufficient to allow gasses to separate from the oil. In the preferred embodiment, the top end 39 is at least four feet above the highest top level 87 of oil in the annulus. The level 87 of oil in the annulus typically fluctuates to match the level of oil in the storage tank 23. For example, most storage tanks have a maximum oil height of twenty feet. Thus in this example, the top end 39 for a typical installation is at least twenty four feet high. This distance may change based upon product volume and custom tank heights.

If there is any gas left in the oil, the oil is foamy and sits on top of the pool until it releases its gas and descends into the pool. Oil falling along the outside surface 67 and near the top of the pool 85 may receive some heat through the wall of the inner vessel 31, which is thermally conductive, being made of steel or some other metal. This assists the oil near the top of the pool in releasing any remaining gas. As the oil cools, it descends in the annulus. By the time the oil reaches the outlet 55 in the bottom of the inner vessel, the oil is "dead", without volatile gasses flashing off under normal ambient conditions. Once the oil leaves the inner vessel, it descends in the annular column to the liquid outlet 55.

The vapor recovery tower works with the temperature and pressure characteristics of fluid columns. The vapor recovery tower 17 allows the oil to flow up, not down, in the fluid column in the inner vessel 31, thus using temperature and pressure to an advantage to separate the gas. The pressure is decreased and the temperature increased at the top of the inner vessel fluid column. The heat exchanger 43 further increases the temperature of the oil. When the oil is allowed to fall into the annulus 49, it is not a free fall, but slowed by flowing along the outside surface 67 of the inner vessel. All of these factors contribute to the separation of gas from the oil.

The dead oil is drawn out of the vapor recovery tower 17 into the storage tank 23. As the oil level in the storage tank fills, it draws oil out of the vapor recovery tower. Alternatively, a rise in oil level in the vapor recover tower can push oil out of the tower into the storage tank. The level 87 of oil in the vapor recovery tower follows the oil level in the storage tank 23. When the pipe 55 is connected to the bottom of the tower, and when connected to the top of the storage tank, the oil level in the tower and storage tank will generally be around that same height. The oil level in the tower will fluctuate based upon the tower pressure which can affect the hydrostatic pressure of the liquid column.

Water from the separation equipment is introduced into the upper portion of the outer vessel by the water inlet 63. The water is directed to the roughened surface 71, which surface breaks the water into smaller particles or droplets. Gas is released more easily from the smaller size particles. The water falls down the annulus 57 to the pool 91. The distance between the water inlet and the top level 93 of the pool is sufficient for the gas to escape the water. The level 93 of water in the vapor recovery tower follows the water level in the storage tank 25.

The pool 91 serves as insulation around the intermediate vessel and the oil therein, thus preserving the higher temperature of the oil to assist with gas separation. This is particularly useful for cold weather operations.

The water in the annulus 57 travels to the bottom of the outer vessel, where it exits via the water outlet 65 and flows to the water storage tank 25. The column of water in outer vessel is tall enough to provide any further residence, or retention, time that may be needed to allow the gas to separate.

The gas from the water circuit rises to the upper space 73 where it commingles with the gas from the oil circuit. Thus, the space 73 is common for gas from both circuits. The gas enters the inlet 77 and travels through pipe 75 to the compressor 19.

The vapor recovery tower 17 is sized according to the particular application. In general, the oil should be retained in the vapor recovery tower, whether in the inner vessel or the intermediate vessel, for a sufficient time to separate the gas from the oil. This typically depends on the characteristics of the oil, gas and the well. In general, vapor recovery towers have oil retention times of at least thirty minutes, unless the particular circumstances require a different retention time. Sizing includes sizing the vessels 31, 33, 35. Gas tends to separate more easily from water than oil, so that water residence times typically need not be a long as oil residence times.

The vapor recovery tower 17 is particularly well suited to surges of liquid produced. If excess oil enters the bottom of the inner vessel 31, it merely pushes into the foamy upper portion, which can absorb the extra volume of oil. Also, if any foam is spilled over the top end 37 of the inner vessel, it descends along the outside surface 67 where it can continue to release gas.

If the amount of excess oil is high, then the oil may rise inside of the intermediate vessel 33, filling that vessel. The oil may spill over into the water annulus 57 of the outer vessel 35. Conversely, if the amount of excess water produced is high, the water may overflow into the intermediate vessel 33. Thus, the possibility of a mechanical failure or a spill from the tower is greatly diminished.

The mingled oil and water flow into the respective storage tank. An operator can recirculate the liquid back through the separation equipment 13, 15. This prevents flooding of downstream compression and metering equipment.

An optional float switch/indicator 97 can be provided, which is triggered when the amount of liquid in the tower reaches an overflow elevation, or close to reaching such an elevation. The operator is alerted to the high level by the indication. The switch may close the inlet valves for the water and the oil, by-pass the streams directly to the tanks 23, 25 or cause some other operation, in order to prevent further liquid from entering the tower.

The vapor recovery tower can be provided with sight glasses at various heights therein.

The vapor recovery tower uses the heat of the compressed gas for the heat exchanger. This is a particularly efficient way of operating the heat exchanger. However, other types of heat exchangers can be used. For example, diesel fuel can be burned to create a hot fluid which circulates through the heat exchanger. Or any other hot liquid or gas can be introduced from various sources an operator may have. Another example involves using the warm oil and gas directly from the well to flow through the heat exchanger, before the oil and gas is processed by an initial piece of equipment, such as the heater treater 13 or separator. Still another example uses heated fluids, such as oil, from the heater treater 13, which heated fluids flow through the heat exchanger.

If a compressor is not used, the gas can be stored in other ways or simply flared off.

Although the preferred embodiment has been described as having an inner first oil path or column, where the oil rises, and an outer second oil path or column, where the oil sinks, this could be in some other configuration. For example, the first oil path or column could be on the outside (inside the intermediate vessel), surrounding an inner second oil path or column. Thus, the oil would rise in the outer oil path or column and descend in the inner oil path or column. As another example, the two oil paths or columns need not be concentric, but could be adjacent to one another. If the two columns are adjacent to one another, there could be two towers, side by side. A conduit or channel connects the first column to the second column to allow oil in the first column to spill over or enter the second column. Gas would either be collected from the upper end of each column, or the gas from one column allowed to flow into the other column, wherein gas could be collected from a single column. In this example, the first column or vessel would have an upper vessel end and an upper liquid end; the upper vessel end is above the upper liquid end. Still another example for side by side columns is a single tower with a vertical partition. The partition divides the tower interior into the first and second columns, with fluid rising in the first column and spilling over the top end of the partition into the second column. The oil level in the second column is below that of the first column. Gas rises to the top of the tower for removal.

The foregoing disclosure and showings made in the drawings are merely illustrative of the principles of this invention and are not to be interpreted in a limiting sense.

The invention claimed is:

1. A method of recovering gas from liquid produced from a well, the liquid comprising oil and gas, the method comprising the steps of:
   a) providing first, second, and third vessels;
   b) the first vessel forming a first oil column, the first oil column having a bottom region and a top region;
   c) flowing oil in the first oil column from the bottom region to the top region;
   d) applying heat to the oil flowing in the first oil column;
   e) allowing the heated oil to exit the first oil column and enter a second oil column, the second oil column located in the second vessel, the second vessel surrounding the first and second oil columns;
   f) flowing the oil in the second oil column from a top of the second oil column toward a bottom of the second oil column;

g) flowing water in a water column in the third vessel, the third vessel enclosing the first and second vessels;
h) allowing the gas to escape the first oil column, the second oil column, and the water column;
i) withdrawing the oil from the second vessel from the bottom of the second oil column;
j) withdrawing the water from the third vessel from the bottom of the water column;
k) collecting the escaped gas from the first and second vessels.

2. The method of recovering gas from liquid produced from a well of claim 1, further comprising the step of foaming the heated oil in the top region of the first oil column.

3. The method of recovering gas from liquid produced from a well of claim 2, further comprising the step of passing the foamed oil exiting the first oil column over a roughened surface so as to break apart bubbles in the foam and allow the gas to escape.

4. The method of recovering gas from liquid produced from a well of claim 1, further comprising the step of impacting water entering the third vessel against a surface and flowing the water in a descending direction.

5. The method of recovering gas from liquid produced from a well of claim 1, further comprising the step of mingling the gas from the first and second vessels.

6. The method of recovering gas from liquid produced from a well of claim 5, wherein the step of collecting the escaped gas further comprises the step of withdrawing the escaped gas with a compressor, compressing the gas and passing the compressed gas through a heat exchanger that applies the heat to the liquid flowing in the first oil column.

\* \* \* \* \*